United States Patent [19]

Burke

[11] 4,391,162
[45] Jul. 5, 1983

[54] FLUID ASSISTED BOOSTER

[75] Inventor: John P. Burke, Leamington Spa, England

[73] Assignee: Automotive Products Limited, Leamington Spa, England

[21] Appl. No.: 183,579

[22] Filed: Sep. 2, 1980

[30] Foreign Application Priority Data

Sep. 5, 1979 [GB] United Kingdom ............... 79 30723

[51] Int. Cl.³ .............................................. G05G 1/00
[52] U.S. Cl. ............................ 74/579 R; 403/DIG. 7
[58] Field of Search ................. 74/579; 403/326, 361, 403/287, DIG. 7

[56] References Cited

U.S. PATENT DOCUMENTS

| 2,154,651 | 4/1939 | Wodack et al. | 403/361 |
| 2,361,046 | 10/1944 | Molly | 74/579 |
| 2,792,813 | 5/1957 | Fixman et al. | 74/579 |
| 3,466,073 | 9/1969 | Pohle | 403/326 |
| 4,192,220 | 3/1980 | Tateoka | 403/326 |
| 4,200,001 | 4/1980 | Kytta | 74/478 |

FOREIGN PATENT DOCUMENTS

| 2411436 | 9/1975 | Fed. Rep. of Germany | 74/579 |
| 1433737 | 4/1976 | United Kingdom . | |
| 1449513 | 9/1976 | United Kingdom . | |

Primary Examiner—Kenneth Dorner
Attorney, Agent, or Firm—Kemon & Estabrook

[57] ABSTRACT

A vacuum assisted booster having an input rod with a thrust member thereon, an output rod with a piston head thereon, and an elastomeric disc located between the thrust member and the piston head. The piston head has an axial bore therein and the thrust member has an axial projection that extends through the elastomeric disc into the bore. The projection is anchored to the piston head by a cap fitted to the head and which allows some forward movement of the thrust member to apply a load to the elastomeric disc but limits axial separation of the piston head and thrust member on the return stroke.

4 Claims, 2 Drawing Figures

FLUID ASSISTED BOOSTER

BACKGROUND OF THE INVENTION

This invention relates to fluid assisted boosters and in particular but not exclusively to vacuum assisted boosters which are typically utilised in motor vehicle hydraulic brake systems.

In a typical vacuum assisted booster as shown in British Pat. No. 964,289 and as illustrated in FIG. 1 of the accompanying drawing, the vacuum booster input rod 11 has a control member 12 on the end thereof. The control member 12 slides in a bore 13 in a movable wall 14 and acts as a thrust member against a load transfer means 15 in the form of an elastomeric disc. The load transfer means 15 abuts against the piston head 16 of an output rod 17. The control member 12 is biased towards an "at-rest" position by a spring 18 acting on the input rod 11. In order to retain the control member 12 in its at-rest position a transverse key 19 is mounted in the movable wall 14 to interconnect with the control member 12. The key is arranged to permit forward displacement of the control member towards the elastic disc, but limits the return displacement of control member caused by the bias of the spring 18, and prevents the control member from being withdrawn from the movable wall.

The provision in the movable wall for the key 19 takes up a larger volume of space than is desirable.

SUMMARY OF THE INVENTION

The object of the present invention is to provide a means of limiting the return displacement of the control means without use of the bulk key.

Accordingly there is provided a fluid assisted booster having an input rod with a thrust member thereon, an output rod having a piston head thereon, and a load transfer means located between the thrust member and the piston head. The piston head has a load bearing face with an axial bore therein and the thrust member has a axial projection that extends through the load transfer means into the bore and is anchored to the piston head by means of a cap fitted to the load bearing face. The anchorage means allows the thrust member a forward stroke towards the output rod to apply a load to the load transfer means but limiting the relative displacement of the thrust member on the return stroke.

Preferably, an elastomeric disc acts as the load transfer means.

DETAILED DESCRIPTION OF THE INVENTION

Figure 2:
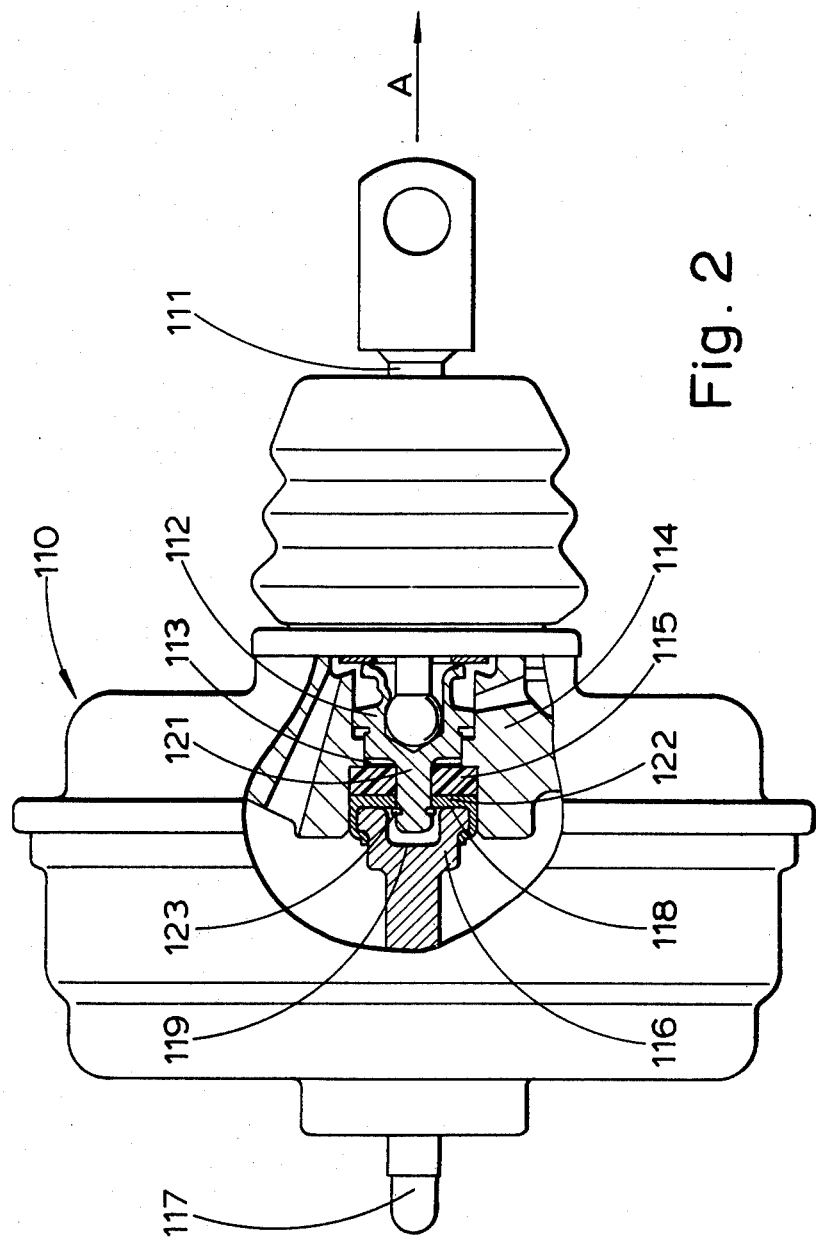
FIG. 2 is a plan view of a fluid assisted a booster with a portion of the shell removed to show a longitudinal section through the movable wall.

With reference to FIG. 2, a motor vehicle vacuum assisted booster 110 has a driver operable coaxial input rod 11 which has a control member 112 secured to the end thereof. The control member 112 slides in a co-axial stepped bore 113 in a movable wall 114 and acts as a thrust member to transmit input loads from the input rod 111 to a load transfer means 115 constituted by an elastomeric rubber disc. The rubber disc 115 transfers the input loads to the piston head 116 of an output rod 117. The elastomeric disc 115 also acts in a well known manner to determine what proportion of the output load is derived from the booster and input loads. In the event of a total failure of the booster input loads are transferred through the disc 115 to the output rod 117.

The piston head 116 has a load bearing face 118 which receives the load from the elastomeric disc 115. The face 118 has a co-axial blind bore 119 therein which receives a co-axial projection 121 of the control member which passes through the centre of the elastomeric disc 115 and a cap 122 which covers the load bearing face 118. The cap 122 encases the piston head 116 and is secured thereto by bent over lugs on the cap 122 to clinch the cap to the head. The projection 121, located in the bore 119, has a clip 123 fitted into a groove on the free end thereof to limit axial separation of the output rod and control member 112 by abutment against the cap. The clip 123 is a close fit inside the bore 119 so that it cannot pull out of the groove in the end of the projection 121 once the cap 122 has been secured to the head 116.

Figure 1:
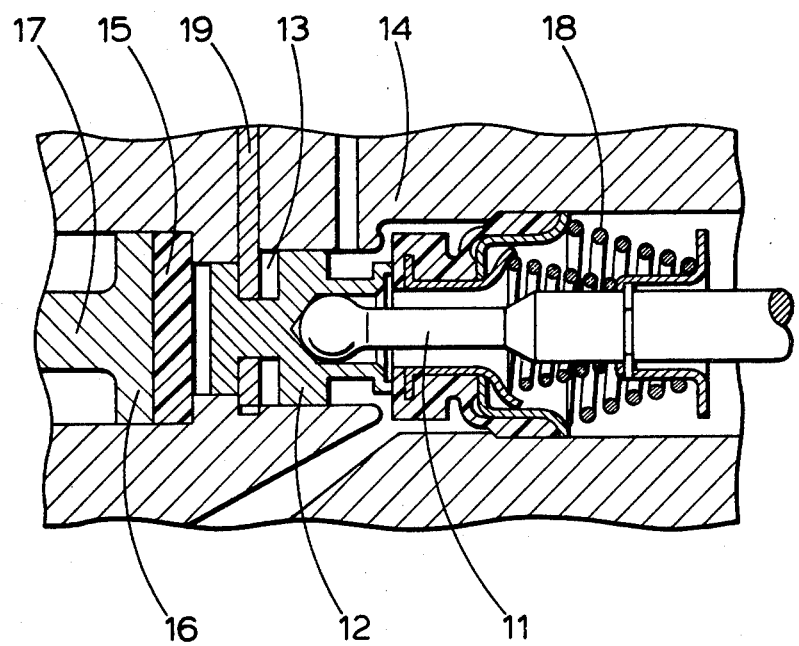
FIG. 1 is a partial cross sectional view of a vacuum assisted as typified by the prior art.

The input rod 111 is biased in the direction of arrow A by a spring (not shown) or by the equivalent of the spring 18 in FIG. 1. The relative displacement of the control member 112 away from the disc 115 and the output rod 117 is limited by the abutment of the clip 123 against the cap.

The clearance between the end of the projection 121 and the end of the bore 119 is such that the control member 112 does not directly contact the output member for the transmission of an input load thereto but allows the control member a forward stroke towards the output rod so as to apply a load to the disc 115.

Whilst the invention has been described with reference to a cap 122 secured to the piston head 116 by peening, it is obvious that a cap or similar disc could be secured to the piston head by a multitude of alternative means, for example, the cap could be clipped into the mouth of the bore 119 in the piston head 116.

I claim:

1. A fluid assisted brake booster having:
    an output rod with a piston head thereon having a load bearing face with an axial bore therein;
    an annular load transfer means located adjacent the load bearing face;
    an input rod located on the other side of the transfer means relative to the output rod and having a thrust member with an axial projection that extends through the centre of the transfer means into said axial bore; and a cap fitted to the load bearing face to provide anchorage means for the thrust member to the piston head, said anchorage means allowing the thrust member a forward stroke towards the output rod to apply a load to the load transfer means but limiting the relative displacement of the thrust member on the return stroke.

2. A booster as claimed in claim 1, wherein the cap has a hole therein through which the thrust member extends, and which allows the thrust member to move freely for axial displacement relative to the output rod, the relative displacement on the return stroke being limited by a clip fixed to the thrust member on the piston head side of the cap.

3. A booster as claimed in claim 1 or claim 2, wherein the cap is secured to the piston head by portions of the cap being peened over the piston head to hold the cap thereto.

4. A booster as claimed in claim 3, wherein the clip is a close fit in the axial bore so that once the cap is secured in place the wall of the bore prevents the clip from being dislodged from the thrust member.

* * * * *